United States Patent
Devarapalli et al.

(10) Patent No.: US 8,244,247 B2
(45) Date of Patent: *Aug. 14, 2012

(54) SERVICE BASED BEARER CONTROL AND TRAFFIC FLOW TEMPLATE OPERATION WITH MOBILE IP

(75) Inventors: Vijay Devarapalli, Sunnyvale, CA (US); Meghana Sahasrabudhe, San Jose, CA (US); Basavaraj Patil, Coppell, TX (US); Kengatharan Sivalingam, Irving, TX (US); Franck Le, Irving, TX (US)

(73) Assignee: Nokia Corporation, Espoo (FI)

( * ) Notice: Subject to any disclaimer, the term of this patent is extended or adjusted under 35 U.S.C. 154(b) by 625 days.

This patent is subject to a terminal disclaimer.

(21) Appl. No.: 12/149,789

(22) Filed: May 8, 2008

(65) Prior Publication Data

US 2008/0212478 A1 Sep. 4, 2008

Related U.S. Application Data

(63) Continuation of application No. 11/142,360, filed on Jun. 2, 2005, now Pat. No. 7,385,946.

(60) Provisional application No. 60/576,406, filed on Jun. 3, 2004, provisional application No. 60/588,347, filed on Jul. 16, 2004.

(51) Int. Cl.
*H04W 4/00* (2009.01)
(52) U.S. Cl. ........... 455/435.3; 370/328; 370/252; 370/401; 455/453; 455/432.2; 455/432.3; 709/220
(58) Field of Classification Search ............ 370/328, 370/252, 401; 455/435.3; 709/220
See application file for complete search history.

(56) References Cited

U.S. PATENT DOCUMENTS

| | | | | |
|---|---|---|---|---|
| 7,984,073 | B1 * | 7/2011 | Basiago et al. | 707/802 |
| 2002/0062379 | A1 * | 5/2002 | Widegren et al. | 709/227 |
| 2002/0080752 | A1 | 6/2002 | Johansson et al. | |
| 2003/0039259 | A1 | 2/2003 | Madour | |
| 2003/0069016 | A1 * | 4/2003 | Bahl et al. | 455/432 |

(Continued)

FOREIGN PATENT DOCUMENTS

WO WO 2004/028053 4/2004

(Continued)

OTHER PUBLICATIONS

"*Session Initiation Protocol (SIP)*", www.devx.com/wireless/Door/11449 Oct. 26, 2004, pp. 1-3.

(Continued)

*Primary Examiner* — Sanh Phu
(74) *Attorney, Agent, or Firm* — Mintz, Levin, Cohn, Ferris, Glovsky & Popeo, P.C.

(57) ABSTRACT

A method for updating filters, at a Packet Data Serving Node, with a care-of-address associated with at least one of a mobile station or a correspondent node. The method includes the steps of implementing a soft filtering rule at a Packet Data Serving Node and receiving, by the Packet Data Serving Node, a care-of-address that is associated with at least one the mobile station and a correspondent node. The method also includes updating, by the Packet Data Serving Node, filters with the care-of-address to correctly identify flows belonging to a particular session during Mobile IP use. The method further includes filtering, by the Packet Data Serving Node, packets including a care-of-address that is associated with one of the mobile station and the correspondent node.

37 Claims, 2 Drawing Sheets

U.S. PATENT DOCUMENTS

| | | |
|---|---|---|
| 2004/0008632 A1 | 1/2004 | Hsu et al. |
| 2005/0165917 A1 | 7/2005 | Le et al. |
| 2006/0246900 A1 | 11/2006 | Zheng |

FOREIGN PATENT DOCUMENTS

| | | |
|---|---|---|
| WO | WO 2004/ 030271 A2 | 4/2004 |
| WO | WO 2004/045159 A2 | 5/2004 |

OTHER PUBLICATIONS

"*PDSN*", www.cisco.com/en/US/tech/tk722/tk488/tech_protocol_home.html Oct. 26, 2004, p. 1.

Tacsik, E., "*PPP Authentication for Deploying Mobile IPv6 in cdma2000*", www.join.uni-muenster,de/Dokumente/drafts/draft-tacsik-mipv6pppauth-cdma2k-0 Sep. 2003, pp. 1-11.

"*Multimedia Messaging Services (MMS)*", www.cdg.org/technology/applications/mms.asp Oct. 25, 2004, p. 1.

"*Multimedia Messaging—Already on a CDMA Phone Near You*", www.cdg.org/technology/applications/mms/index.asp Mar. 2003, pp. 1-7.

Chowdhury, et al., "*Wireless Packet Data Networking*" 3GPP2 TSG-X TFT Operation With MIP6, Apr. 2004, pp. 1-7.

Knight, et al., "*Bearer-Independent Call Control*" BT Technol J vol. 19, No. 2, Apr. 2001, pp. 77-88.

Tadault, m. et al., "*Network Evolution Towards IP Multimedia Subsystem*" Alcatel Telecommunications Review, $4^{th}$ Quarter 2003/$1^{st}$ Quarter 2003, pp. 2-8.

\* cited by examiner

SERVICE BASED BEARER CONTROL AND TRAFFIC FLOW TEMPLATE OPERATION WITH MOBILE IP

This is a Continuation of application Ser. No. 11/142,360, filed Jun. 2, 2005, which claims the priority of U.S. Provisional Application No. 60/576,406, filed on Jun. 3, 2004 and provisional application No. 60/588,347, filed on Jul. 16, 2004. The disclosures of the prior applications are hereby incorporated by reference in their entirety.

BACKGROUND OF THE INVENTION

1. Field of the Invention

The present invention relates to method for solving Mobile IP related filtering issues and more particularly to a method for creating filters that allow for the use of care-of-address by a mobile station and a correspondent node.

2. Description of the Related Art

In cdma2000 networks, a Packet Data Serving Node (PDSN) acts as an access node for a mobile station and creates a number of filters for active sessions associated with the mobile station. Specifically, there are two types of filters in the PDSN. The first type includes Service Based Local Policy (SBLP) filters that are set up by the network for Multimedia Messaging Service (MMS). These filters are based on the subscriber profile of the mobile station and are set up by a Policy Decision Function (PDF) associated with the PDSN. The second type includes Traffic Flow Template (TFT) that is set up by the mobile station for traffic flows. These filters provide specific flow treatment to each session between the mobile station and the PDSN. As such, the PDSN does not allow any un-authorized traffic that does not match any of the filters to be forwarded to or from the mobile station. Typically, the filters have source and destination addresses/ports as selectors in order to be able to identify the flows.

When using Mobile IP, the mobile station uses its home address during Session Initiation Protocol (SIP) negotiation for a session between the mobile station and a correspondent node. Thus, the SBLP filters set up by Proxy Call Session Control Function (P-CSCF) and PDF include the home addresses of the mobile station and the correspondent node. However, the mobile station is assigned a care-of-address from a visited network in addition to its home address when the mobile station is using Mobile IP. Thereafter, all traffic sent by the mobile station has the care-of-address as the source address. Similarly, traffic from the correspondent node includes the mobile station's care-of-address as the destination address. As such, the information in the packets from the mobile station does not match any of the filters set up at the PDSN and the packets are dropped by the PDSN.

The problem described above becomes worse when the correspondent node is also a mobile node and uses its care-of-address as the source address. In addition to packets from the mobile station being dropped by the PDSN, when the correspondent node uses its care-of-address as the source address, packets from the correspondent node also do not match any of the filters at the PDSN that have the correspondent node's home address. Moreover, even in solutions where the PDSN somehow updates the filters with the correspondent node's care-of-address, if the correspondent node moves and attaches to a new IP subnet, then its care-of-address changes in the middle of a session causing packets with the new care-of-address to not match the source address in the filters of the PDSN and the PDSN to drop the packets.

In one example that further describes the problem outlined above, during the session between the correspondent node and the mobile station, the correspondent node performs return routablility and route optimization functions and sends a Care-of-Test init message to the mobile station. The message includes the correspondent node's care-of-address in the source field. As such, the source address for the correspondent node in the message does not match the information in the SBLP filters that was established during SIP negotiation, causing the PDSN to drop the packet. Hence, the mobile station will not receive the message and the return routablility and route optimization functions will fail.

One solution to the problem identified above is to map the packet to a default service instance at the PDSN. This causes the packet to reach the mobile station so that the return routablility and route optimization functions can proceed as normal. If the route optimization function succeeds, all subsequent packets from the correspondent node to the mobile station will have the correspondent node's care-of-address in the source field. This solution, however, causes a permanent failure of the SBLP filter and makes the mobile station vulnerable to Denial-of-Service attacks because any sender with a malicious intent can flood the mobile station with junk IP packets using any source address. Furthermore, destination packets will also have the correspondent node's care-of-address instead of its home address. However, if packets from the mobile station to the correspondent node do not include the correspondent node's home address, the PDSN will not allow the packets to be forwarded to the correspondent node.

The problem is slightly different with TFT filters. When the mobile station sets up TFT filters, it uses the correspondent node's home address. When the correspondent node sends packets using its care-of-address as the source address, these packets will not match the TFT filters at the PDSN and hence will not get the right flow treatment.

SUMMARY OF THE INVENTION

According to one aspect of the invention, there is provided a method for updating filters, at a Packet Data Serving Node, with a care-of-address associated with at least one of a mobile station or a correspondent node. The method includes the steps of implementing a soft filtering rule at a Packet Data Serving Node and receiving, by the Packet Data Serving Node, a care-of-address that is associated with at least one the mobile station and a correspondent node. The method also includes updating, by the Packet Data Serving Node, filters with the care-of-address to correctly identify flows belonging to a particular session during Mobile IP use. The method further includes filtering, by the Packet Data Serving Node, packets including a care-of-address that is associated with one of the mobile station and the correspondent node.

According to another aspect of the invention there is provided a network node for updating filters with a care-of-address associated with at least one of a mobile station or a correspondent node. The network node includes implementing means for implementing a soft filtering rule and receiving means for receiving a care-of-address that is associated with at least one a mobile station and a correspondent node. The network node also includes updating means for updating filters with the care-of-address to correctly identify flows belonging to a particular session during Mobile IP use. The network node further includes filtering means for filtering packets including a care-of-address that is associated with one of the mobile station and the correspondent node.

According to another aspect of the invention, there is provided an apparatus for updating filters, at a Packet Data Serving Node, with a care-of-address associated with at least one of a mobile station or a correspondent node. The apparatus includes implementing means for implementing a soft filtering rule at a Packet Data Serving Node. The apparatus also includes receiving means for receiving, by the Packet Data Serving Node, a care-of-addresses associated with at least one of the mobile station and a correspondent node. The apparatus further includes updating means for updating, by the Packet Data Serving Node, filters with the care-of-address to correctly identify flows belonging to a particular session during Mobile IP use. The method also includes filtering means for filtering, by the Packet Data Serving Node, packets including the care-of-address that is associated with one of the mobile station and the correspondent node.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF THE PREFERRED EMBODIMENT(S)

Reference will now be made to the preferred embodiments of the present invention, examples of which are illustrated in the accompanying drawings.

Figure 1:
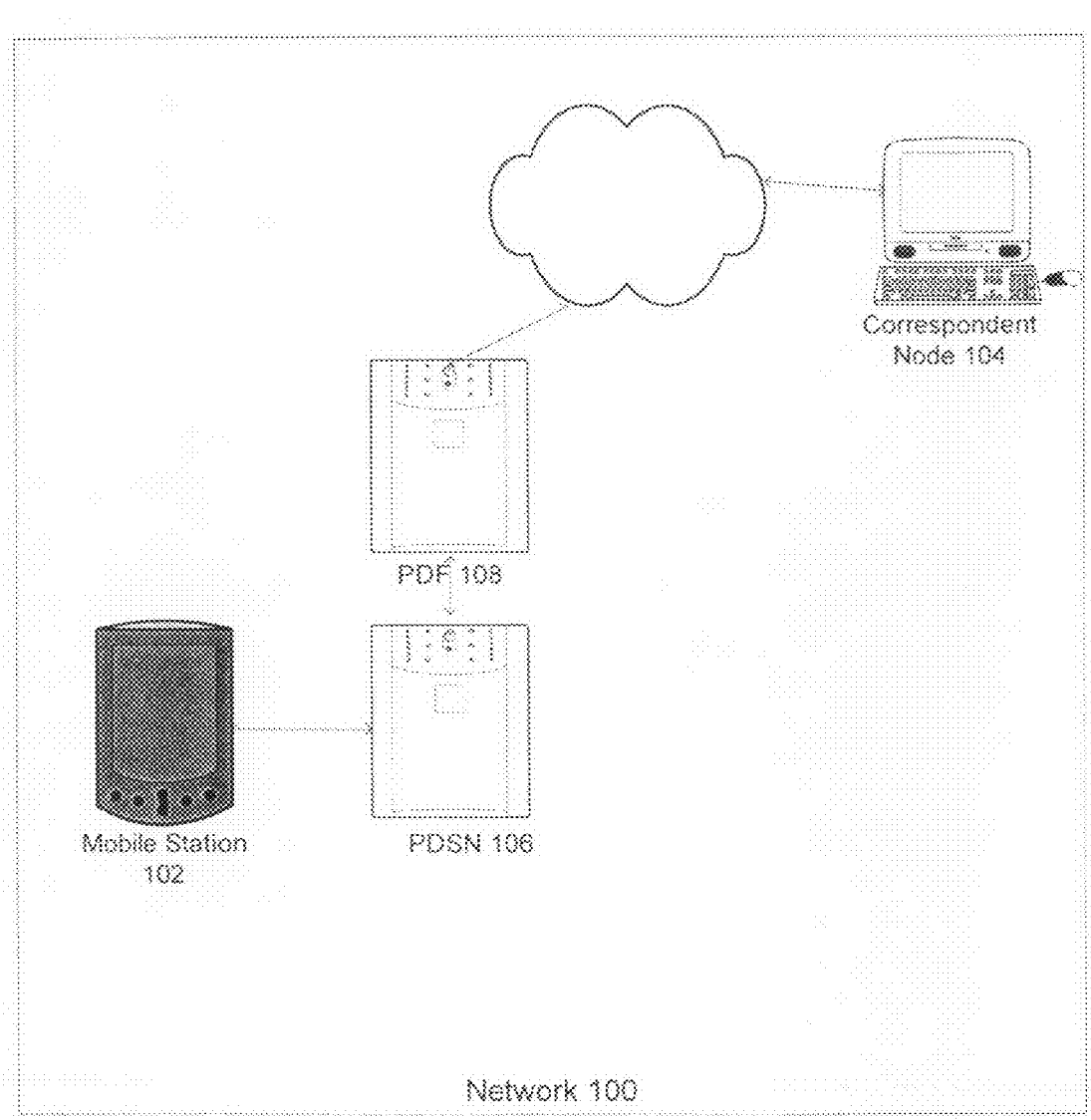
FIG. 1 illustrates a wireless network 100 that can be used in an embodiment of the invention.

FIG. 1 illustrates a wireless network 100 that can be used in an embodiment of the invention. Network 100 includes a mobile station 102, a correspondent node 104, a Packet Data Serving Node (PDSN) 106 and a Policy Decision Function 108. Mobile station 102 is a part of a wireless network that is running Internet Protocol version 6 (IPv6) and mobile station 102 configures its IPv6 address with a prefix from PDSN 106. During SIP negotiation for a session between mobile station 102 and correspondent node 104, correspondent node 104 uses its home address as the connection address and the mobile station uses its IPv6 address as the connection address. Policy Decision Function 108 then sends a Service Based Local Policy (SBLP) filter set to PDSN 106 for PDSN 106 to apply the SBLP filter on bearer flows associated with the negotiated session. As such the SBLP filter set includes correspondent node's home address as its source and destination address. Additionally, mobile station 102 send a Traffic Flow Template (TFT) to PDSN 106 to map the resulting flow(s) to desired service instances. The TFT also includes the correspondent node's home address as its source address.

To resolve issues relating to matching filters in PDSN 106 with care-of-addresses associated with mobile station 102 and correspondent node 104 during Mobile IP, one embodiment of the invention requires PDSN 106 to be aware of the home addresses and care-of-address of mobile station 102 and correspondent node 104 at all times to be able to match the IP flows with the filters. Specifically, PDSN 106 is required to know the mobile station's home address, the mobile station's care of address, the correspondent node's home address and the correspondent node's care of address, if the correspondent node is also a mobile node, at all times. This embodiment therefore requires that the PDSN's filters be updated once mobile station 102 knows its care-of-address and its home address. The filters also need to be updated every time correspondent node 104 moves and acquires a new care of address.

An embodiment of the invention provides a generic solution to solve Mobile IP related SBLP and TFT operation issues. A soft filtering rule has been installed in PDSN 106 to allow Mobility Header messages. Specifically, the soft rule installed in the PDSN allows one message every 400 seconds per Mobility Header message type. If Mobility Header messages are sent more often, they are dropped by the PDSN. The 400 seconds is based on the fact that the maximum binding lifetime for return routability mechanisms is 420 seconds. However, the embodiment of the invention allows for a configurable parameter in place of the 400 seconds on PDSN 106. Therefore, as is apparent to one of ordinary skill in the art an operator may use different values.

According to another embodiment of the invention, if mobile station 102 and correspondent node 104 already have an active route optimised session, the soft rule can be modified to allow one message every one minute per Mobility Header message type per mobile station 102 care-of-address. This is based on the assumption that mobile nodes do not move more often than one minute. This soft rule allows Route Optimization and Mobile IP signalling messages to be initiated by mobile nodes from outside the CDMA network. The invention limits mobility header messages to avoid dropping by PDSN 106.

In addition to the soft rule outlined above, once mobile station 102 knows the set of possible addresses that might appear on its IP sessions, mobile station 102 sends a care-of-address update message to PDSN 106 for PDSN 106 to update the filters specific to mobile station 102. Mobile station 102 also informs PDSN 106 whenever the care-of-address of correspondent node 104 changes. Specifically, if correspondent node 104 is also a mobile node and acquires a new care of address, correspondent node 104 updates mobile station 102 with its new care-of-address as part of Mobile IP operation. The soft rule described in an embodiment of the invention allows return routability messages from the new care-of-address of correspondent node 104 to reach mobile station 102. Mobile station 102 then sends a message to PDSN 106 to update the filters. The invention therefore allows for the use of a care-of-address update message to update filters which are specific to mobile station 102. PDSN 106 uses the care-of-address information, in addition to available SBLP parameters, to match packets against the filters. This allows PDSN 106 to correctly identify the flows belonging to a particular session when Mobile IP is used. Specifically, PDSN 106 uses the care-of-address information for matching the filters against incoming and outgoing packets when Mobile IP is used.

In cdma2000 networks, mobile station 102 and PDSN 106 always establish a PPP link. According to embodiments of the invention, the care-of-address update message can utilize vendor specific extensions, RSVP messages, or other update message types which are appropriate for a particular application. In one embodiment, mobile station 102 uses a PPP Vendor Specific Packet to update the filters at PDSN 106. According to another embodiment of the invention, mobile station 102 uses Resv and ResvConf messages for TFT filter establishment at PDSN 106. These messages may be reused to send the Filter Update message that is defined in the TFT. Specifically, mobile station 102 may use the Resv message to send the filter update to PDSN 106. When PDSN 106 receives a care-of-address update message from mobile station 102, it updates the care-of-address information, if any, attached to both SBLP and TFT filters specific to mobile station 102. According to an embodiment, PDSN 106 never replaces the IP address found in the filters with the care-of-address address.

The discussion above is based on the assumption that PDSN 106 accepts the filter update messages from mobile station 102. In some cases, however, PDSN 106 might refuse to update filters created by PDF 108 without explicit authorization from PDF 108 prior to updating the filters. In these cases, mobile station 102 sends a filter update RSVP message along with a token that identifies mobile station 102 to PDF 108. PDSN 106 sends an authorization request that includes the token sent by mobile station 102 in the RSVP message. PDF 108 determines that the authorization request from mobile station 102 is for filters associated with the care-of-address of correspondent node 104. Thereafter, PDF 108 sends an authorization response to PDSN 106, which enables PDSN 106 to update the filters with the care-of-address of correspondent node 104.

The invention may also include a configuration wherein after correspondent node 104 starts using a new care-of-address, PDSN 106 checks the data packets to observe a change of care-of-address. In an embodiment, PDSN 106 may observe a predefined number of packets with the new care-of-address/home address association before it updates the care-of-address information attached to the filters.

The invention may also include a configuration wherein PDSN 106 creates a temporary state upon detecting a binding update message from correspondent node 104. In such a configuration, mobile station 102 may then send a binding acknowledgement to assure the network that a valid binding update was received. PDSN can then update the care-of-address information attached to the packet filters. Specifically, PDSN 106 creates a temporary state upon detecting a Binding Update message from correspondent node 104. Thereafter, when mobile station 102 sends a Binding Acknowledgement message with an indication of success, the network is assured that the Binding Update message was a valid, and PDSN 106 can update the care-of-address information attached to the packet filters.

The invention can also include a configuration wherein filter matching is performed at the PDSN 106. The SBLP and TFT are initially set to match the home addresses of mobile station 102 and correspondent node 104. When correspondent node 104 (or the mobile station 102) starts using a care of address, packets from mobile station 102 and correspondent node 104 will not match the filters set at the PDSN. If the correspondent node moves, it initiates return routability signaling to update mobile station 102. After return the routability signaling is complete, correspondent node 104 starts using the new care of address. Correspondent node 104 uses the care-of-address to communicate with mobile station 102, whenever Mobile IP is used, and PDSN 106 performs the appropriate filter matching. Specifically, in the downlink direction, the source IP address part of a filter is considered a match with a packet in the downlink direction when the IP address matches the source field of the IP packet; or the IP address matches the home address field of the Destination Options extension header and the care-of-address of correspondent node 104 matches the source field of the packet. In the uplink direction, the destination IP address part of a filter is considered a match with a packet in the uplink direction when the IP address matches the destination field of the IP packet or the IP address matches the home address field of the routing extension header and the care-of-address of the correspondent node matches the destination field of the packet. Note that the care-of-address of correspondent node 104 is available at the PDSN and updated by mobile station 102 as described above. As is apparent to one skilled in the art, other matching configurations may be within the scope and spirit of the invention.

Figure 2:
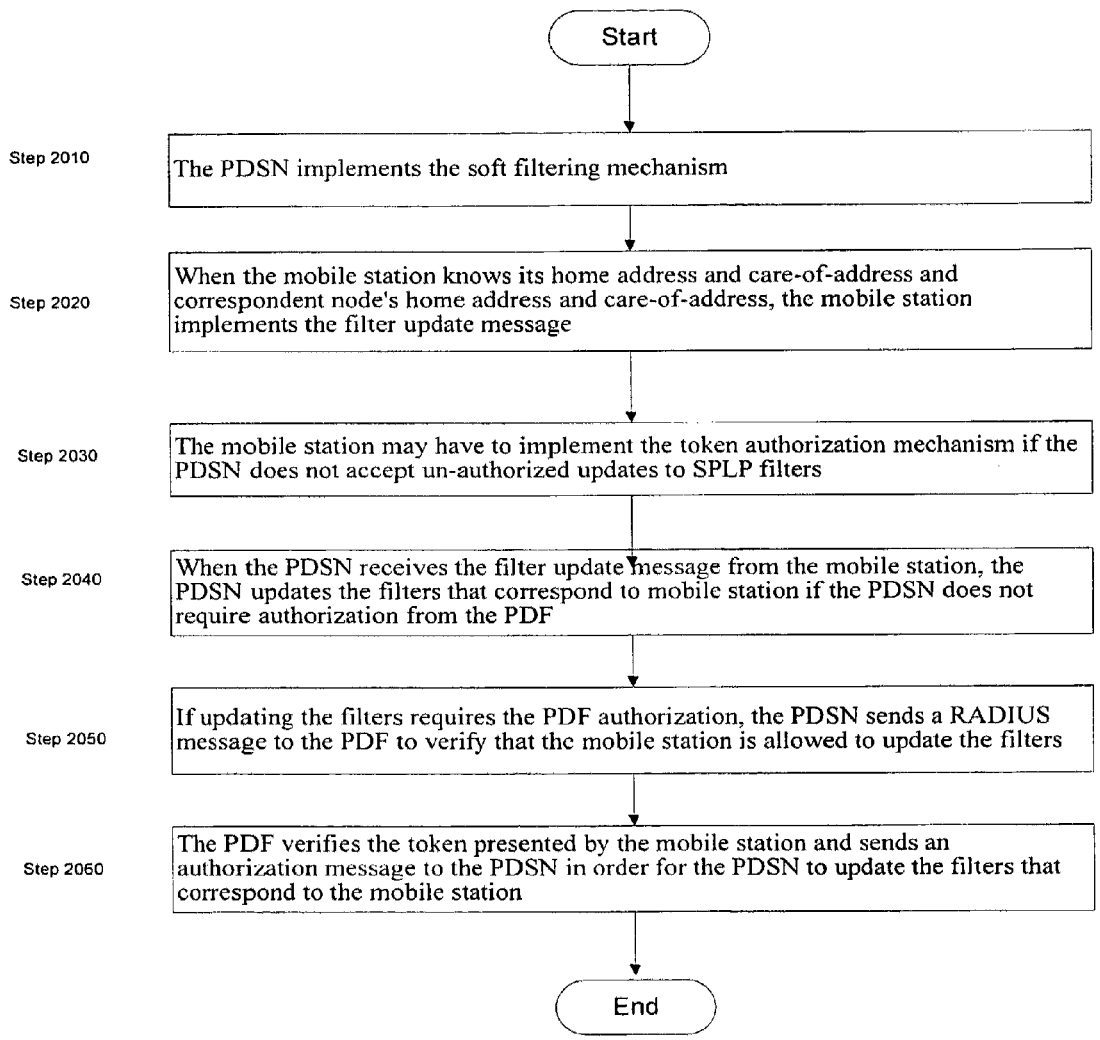
FIG. 2 illustrates the steps implemented in an embodiment of the present invention.

FIG. 2 illustrates the steps implemented in an embodiment of the present invention. In Step 2010, PDSN 106 implements the soft filtering mechanism of the present invention. In Step 2020, when mobile station 102 knows its home address and care-of-address and correspondent node's home address and care-of-address, mobile station 102 implements the filter update message. In Step 2030, mobile station 102 may have to implement the token authorization mechanism if PDSN 106 does not accept un-authorized updates to SPLP filters. In Step 2040, when PDSN 106 receives the filter update message from mobile station 102, PDSN 106 updates the filters that correspond to mobile station 102 if PDSN 106 does not require authorization from the PDF 108. In Step 2050, if updating the filters requires PDF 108 authorization, PDSN 106 sends a RADIUS message to PDF 108 to verify that mobile station 102 is allowed to update the filters. In Step 2060, PDF 108 verifies the token presented by mobile station 102 and sends an authorization message to PDSN 106 in order for PDSN 106 to update the filters that correspond to mobile station 102.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed:

1. A method, comprising:
   implementing a soft filtering rule at a packet data serving node;
   receiving, at the packet data serving node, a care-of-address associated with at least one of the mobile station and a correspondent node different from the packet data serving node; and
   updating, at the packet data serving node, at least one of a plurality of filters configured in accordance with the soft filtering rule, the at least one of the plurality of filters updated with the care-of-address to correctly identify flows belonging to a particular session during mobile internet protocol use.

2. The method of claim 1, wherein the implementing comprises allowing at least one mobility header message at a predetermined time, wherein the predetermined time is a configurable parameter.

3. The method of claim 2, wherein the predetermined time is 400 seconds.

4. The method of claim 1, wherein the updating comprises updating a service based local policy and a traffic flow template.

5. The method of claim 1, wherein the filtering comprises matching a source internet protocol address part of a filter with a packet in a downlink direction when at least one of the source internet protocol address matches a source field of an internet protocol packet or the source internet protocol address matches a home address of a destination options extension header and the care-of-address of the correspondent node matches the source field of the packet.

6. The method of claim 1, wherein the filtering comprises matching a destination internet protocol address part of a filter with a packet in a uplink direction when at least one of a internet protocol address matches a destination field of an internet protocol packet or the internet protocol address matches a home address of a routing extension header and the care-of-address of the correspondent node matches the destination field of the packet.

7. A method, comprising:
implementing a soft filtering rule at a packet data serving node;
receiving, at the packet data serving node, a care-of-address associated with at least one of the mobile station and a correspondent node; and
updating, at the packet data serving node, at least one of a plurality of filters configured in accordance with the soft filtering rule, the at least one of the plurality of filters updated with the care-of-address to correctly identify flows belonging to a particular session during mobile internet protocol use, wherein the implementing comprises allowing one message at a predetermined time per mobility header message type for the care-of-address, if the mobile station and the correspondent node have an active route optimized session.

8. A method, comprising:
implementing a soft filtering rule at a packet data serving node;
receiving, at the packet data serving node, a care-of-address associated with at least one of the mobile station and a correspondent node; and
updating, at the packet data serving node, at least one of a plurality of filters configured in accordance with the soft filtering rule, the at least one of the plurality of filters updated with the care-of-address to correctly identify flows belonging to a particular session during mobile internet protocol use, wherein the implementing comprises initiating route optimization and mobile internet protocol signaling messages by mobile stations outside of a code division multiple access network.

9. A method, comprising:
implementing a soft filtering rule at a packet data serving node;
receiving, at the packet data serving node, a care-of-address associated with at least one of the mobile station and a correspondent node; and
updating, at the packet data serving node, at least one of a plurality of filters configured in accordance with the soft filtering rule, the at least one of the plurality of filters updated with the care-of-address to correctly identify flows belonging to a particular session during mobile internet protocol use, wherein the receiving comprises receiving, from the mobile station, a care-of-address update message when the mobile station determines a set of possible addresses that might appear on an internet protocol session that is associated with the mobile station.

10. The method of claim 9, wherein the receiving comprises receiving the care-of-address update message in one of vendor specific extensions, resource reservation protocol messages, or other message types from the mobile station.

11. The method of claim 10, wherein the receiving comprises informing the mobile station of a newly acquired care-of-address by the correspondent node.

12. A method, comprising:
implementing a soft filtering rule at a packet data serving node;
receiving a care-of-address associated with at least one of the mobile station and a correspondent node; and
updating filters with the care-of-address to correctly identify flows belonging to a particular session during mobile internet protocol use, wherein the receiving comprises receiving a token that identifies the mobile station, wherein if the packet data serving node requires authorization prior to performing the updating, the packet data serving node forwards the token to a policy decision function which uses the token to determine if authorization is appropriate and provides an appropriate response to the packet data serving node.

13. A method, comprising:
implementing a soft filtering rule at a packet data serving node;
receiving a care-of-address associated with at least one of the mobile station and a correspondent node;
updating filters with the care-of-address to correctly identify flows belonging to a particular session during mobile internet protocol use; and
after the correspondent node starts using a new care-of-address, checking a predefined number of data packets to observe a change of the care-of-address, prior to the updating.

14. A method, comprising:
implementing a soft filtering rule at a packet data serving node;
receiving a care-of-address associated with at least one of the mobile station and a correspondent node;
updating filters with the care-of-address to correctly identify flows belonging to a particular session during mobile internet protocol use;
creating a temporary state upon detecting a binding update message from the correspondent node; and
receiving a binding acknowledgement message from the mobile station to verify that the binding update message is valid, prior to the updating.

15. An apparatus, comprising:
an implementer configured to implement a soft filtering rule;
a receiver configured to receive a care-of-address that is associated with at least one of a mobile station and a correspondent node; and
an updater configured to update at least one of a plurality of filters configured in accordance with the soft filtering rule, the at least one of the plurality of filters updated with the care-of-address to correctly identify flows belonging to a particular session during mobile internet protocol use, wherein the apparatus comprises a packet data serving node including the at least one or the plurality of filters being updated.

16. The apparatus of claim 15, wherein the implementer comprises an allower configured to allow at least one mobility header message at a predetermined time, wherein the predetermined time is a configurable parameter.

17. The apparatus of claim 15, wherein the receiver receives a care-of-address update message in one of vendor specific extensions, resource reservation protocol messages or other message types.

18. The apparatus of claim 15, wherein the updater updates a service based local policy and a traffic flow template.

19. The apparatus of claim 15, wherein the filter comprises a matcher configured to match a destination internet protocol address part of a filter with a packet in a uplink direction when at least one of a internet protocol address matches a destination field of an internet protocol packet or the internet protocol address matches a home address of a routing extension header and the care-of-address of the correspondent node matches the destination field of the packet.

20. The apparatus of claim 15, wherein the apparatus comprises a network node.

21. An apparatus, comprising:
an implementer configured to implement a soft filtering rule;
a receiver configured to receive a care-of-address that is associated with at least one of a mobile station and a correspondent node; and
an updater configured to update at least one of a plurality of filters configured in accordance with the soft filtering rule, the at least one of the plurality of filters updated with the care-of-address to correctly identify flows belonging to a particular session during mobile internet protocol use, wherein the at least one of a plurality of filters is configured to filter packets including the care-of-address that is associated with at least one of the mobile station and the correspondent node, wherein the implementer further comprises an allower configured to allow at least one message at a predetermined time per mobility header message type for the care-of-address, if the mobile station and the correspondent node have an active route optimized session, wherein the apparatus comprises a packet data serving node including the at least one or the plurality of filters being updated.

22. The apparatus of claim 21, wherein the apparatus comprises a network node.

23. An apparatus, comprising:
an implementer configured to implement a soft filtering rule;
a receiver configured to receive a care-of-address that is associated with at least one of a mobile station and a correspondent node;
an updater configured to update at least one of a plurality of filters configured in accordance with the soft filtering rule, the at least one of the plurality of filters updated with the care-of-address to correctly identify flows belonging to a particular session during mobile internet protocol use, wherein the at least one of the plurality of filters is configured to filter packets including the care-of-address that is associated with at least one of the mobile station and the correspondent node, wherein the implementer comprises an initiator configured to initiate route optimization and mobile internet protocol signaling messages by at least one mobile station outside of a code division multiple access network, wherein the apparatus comprises a packet data serving node including the at least one or the plurality of filters being updated.

24. The apparatus of claim 23, wherein the apparatus comprises a network node.

25. An apparatus, comprising:
an implementer configured to implement a soft filtering rule;
a receiver configured to receive a care-of-address that is associated with at least one of a mobile station and a correspondent node;
an updater configured to update at least one of a plurality of filters configured in accordance with the soft filtering rule, the at least one of the plurality of filters updated with the care-of-address to correctly identify flows belonging to a particular session during mobile internet protocol use, wherein the at least one of the plurality of filters is configured to filter packets including the care-of-address that is associated with the at least one of the mobile station and the correspondent node, wherein the receiver receives, from the mobile station, a care-of-address update message when the mobile station determines a set of possible addresses that might appear on an internet protocol session that is associated with the mobile station, wherein the apparatus comprises a packet data serving node including the at least one or the plurality of filters being updated.

26. The apparatus of claim 25, wherein the apparatus comprises a network node.

27. An apparatus, comprising:
an implementer configured to implement a soft filtering rule;
a receiver configured to receive a care-of-address that is associated with at least one of a mobile station and a correspondent node;
an updater configured to update filters with the care-of-address to correctly identify flows belonging to a particular session during mobile internet protocol use; and
a filter configured to filter packets including a care-of-address that is associated with one of the mobile station and the correspondent node, wherein the receiver receives a newly acquired care-of-address sent by the correspondent node to the mobile station.

28. The apparatus of claim 27, wherein the apparatus comprises a network node.

29. An apparatus, comprising:
an implementer configured to implement a soft filtering rule;
a receiver configured to receive a care-of-address that is associated with at least one of a mobile station and a correspondent node;
an updater configured to update filters with the care-of-address to correctly identify flows belonging to a particular session during mobile internet protocol use; and
a filter configured to filter packets including a care-of-address that is associated with one of the mobile station and the correspondent node, wherein the receiver receives a token that identifies the mobile station, wherein if the packet data serving node requires authorization prior to performing the updating, the packet data serving node forwards the token to a policy decision function which uses the token to determine if authorization is appropriate and provides an appropriate response to the packet data serving node.

30. The apparatus of claim 29, wherein the apparatus comprises a network node.

31. An apparatus, comprising:
an implementer configured to implement a soft filtering rule;
a receiver configured to receive a care-of-address that is associated with at least one of a mobile station and a correspondent node;
an updater configured to update filters with the care-of-address to correctly identify flows belonging to a particular session during mobile internet protocol use; and
a filter configured to filter packets including a care-of-address that is associated with one of the mobile station and the correspondent node, further comprising a checker configured to check, after the correspondent node starts using a new care-of-address, a predefined number of data packets to observe a change of the care-of-address, prior to the updating.

32. The apparatus of claim 31, wherein the apparatus comprises a network node.

33. An apparatus, comprising:
an implementer configured to implement a soft filtering rule;
a receiver configured to receive a care-of-address that is associated with at least one of a mobile station and a correspondent node;

an updater configured to update filters with the care-of-address to correctly identify flows belonging to a particular session during mobile internet protocol use; and a filter configured to filter packets including a care-of-address that is associated with one of the mobile station and the correspondent node, further comprising a creator configured to create a temporary state upon detecting a binding update message from the correspondent node; and a receiver configured to receive a binding acknowledgement message from the mobile station to verify that the binding update message is valid, prior to the updating.

34. The apparatus of claim 33, wherein the apparatus comprises a network node.

35. The apparatus of claim 15, wherein the filter comprises a matcher configured to match a source internet protocol address part of a filter with a packet in a downlink direction when at least one of the source internet protocol address matches a source field of an internet protocol packet or the source internet protocol address matches a home address of a destination options extension header and the care-of-address of the correspondent node matches the source field of the packet.

36. A method, comprising:
determining, by a mobile station, at least a care-of-address associated with at least one of the mobile station and a correspondent node; and
sending, by the mobile station to a packet data serving node, a filter update message comprising the care-of-address associated with at least one of the mobile station and the correspondent node to allow updating a soft filtering rule implemented at the packet data serving node with the care-of-address associated with at least one of the mobile station and the correspondent node different from the packet data serving node.

37. An apparatus, comprising:
a mobile station comprising a determiner configured to determine at least a care-of-address associated with at least one of the mobile station and a correspondent node, and further configured to send, to a packet data serving node, a filter update message comprising the care-of-address associated with at least one of the mobile station and the correspondent node to allow updating a soft filtering rule implemented at the packet data serving node with the care-of-address associated with at least one of the mobile station and the correspondent node different from the packet data serving node.

* * * * *